US012719845B2

(12) United States Patent
Balin et al.

(10) Patent No.: US 12,719,845 B2
(45) Date of Patent: Aug. 25, 2026

(54) COLLABORATIVE DECISION-MAKING IN EDGE CLUSTERS

(71) Applicant: Dell Products L.P., Round Rock, TX (US)

(72) Inventors: Maxim Balin, Gan-Yavne (IL); Efi Levi, Beer Sheva (IL); Lior Benisty, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 16 days.

(21) Appl. No.: 18/929,982

(22) Filed: Oct. 29, 2024

(65) Prior Publication Data

US 2026/0122049 A1 Apr. 30, 2026

(51) Int. Cl.
*H04L 9/40* (2022.01)

(52) U.S. Cl.
CPC .................................... *H04L 63/08* (2013.01)

(58) Field of Classification Search
CPC ........................................................ H04L 63/08
See application file for complete search history.

(56) References Cited

U.S. PATENT DOCUMENTS 11,218,481 B2 * 1/2022 Khalil .................. H04L 9/3247
11,630,709 B2 * 4/2023 McClure ............. G06Q 20/405 719/328
2013/0290704 A1 * 10/2013 Giniger ............... H04L 63/0823 713/156
2017/0289134 A1 * 10/2017 Bradley .............. H04L 63/0815
2019/0280871 A1 * 9/2019 Subramanian .......... H04L 63/08
2022/0407861 A1 * 12/2022 Beecham ................ H04L 63/08
2023/0138816 A1 * 5/2023 Nguyen ................. G16Y 30/10 726/26
2023/0254299 A1 * 8/2023 Stewart .................. H04L 63/08 713/168
2024/0348592 A1 * 10/2024 Fraser Brown ....... H04L 63/101

FOREIGN PATENT DOCUMENTS

AU 2018100503 A4 * 6/2018
CN 114239044 A * 3/2022 ......... G06F 21/6218
JP 2025529912 A * 9/2025 ........... H04L 9/3234
WO WO-2022072626 A1 * 4/2022 ........... G06F 16/901

* cited by examiner

*Primary Examiner* — John B King
(74) *Attorney, Agent, or Firm* — WOMBLE BOND DICKINSON (US) LLP

(57) ABSTRACT

Methods and systems for providing computer implemented services are disclosed. To provide the services, requests for access to resources may be sent. Prior to servicing requests that are received, the requests may be evaluated using a distributed consensus analysis process. The distributed consensus analysis process may take into account views of multiple devices regarding whether the requests can be validated. Requests that are validated via the distributed consensus analysis process may be honored.

20 Claims, 5 Drawing Sheets

Infrastructure 101
Data Processing System 102
Data Processing System 103
Other Systems 104
Communication System 105
Management System 100

COLLABORATIVE DECISION-MAKING IN EDGE CLUSTERS

FIELD

Embodiments disclosed herein relate generally to system management. More particularly, embodiments disclosed herein relate to authentication and management of systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
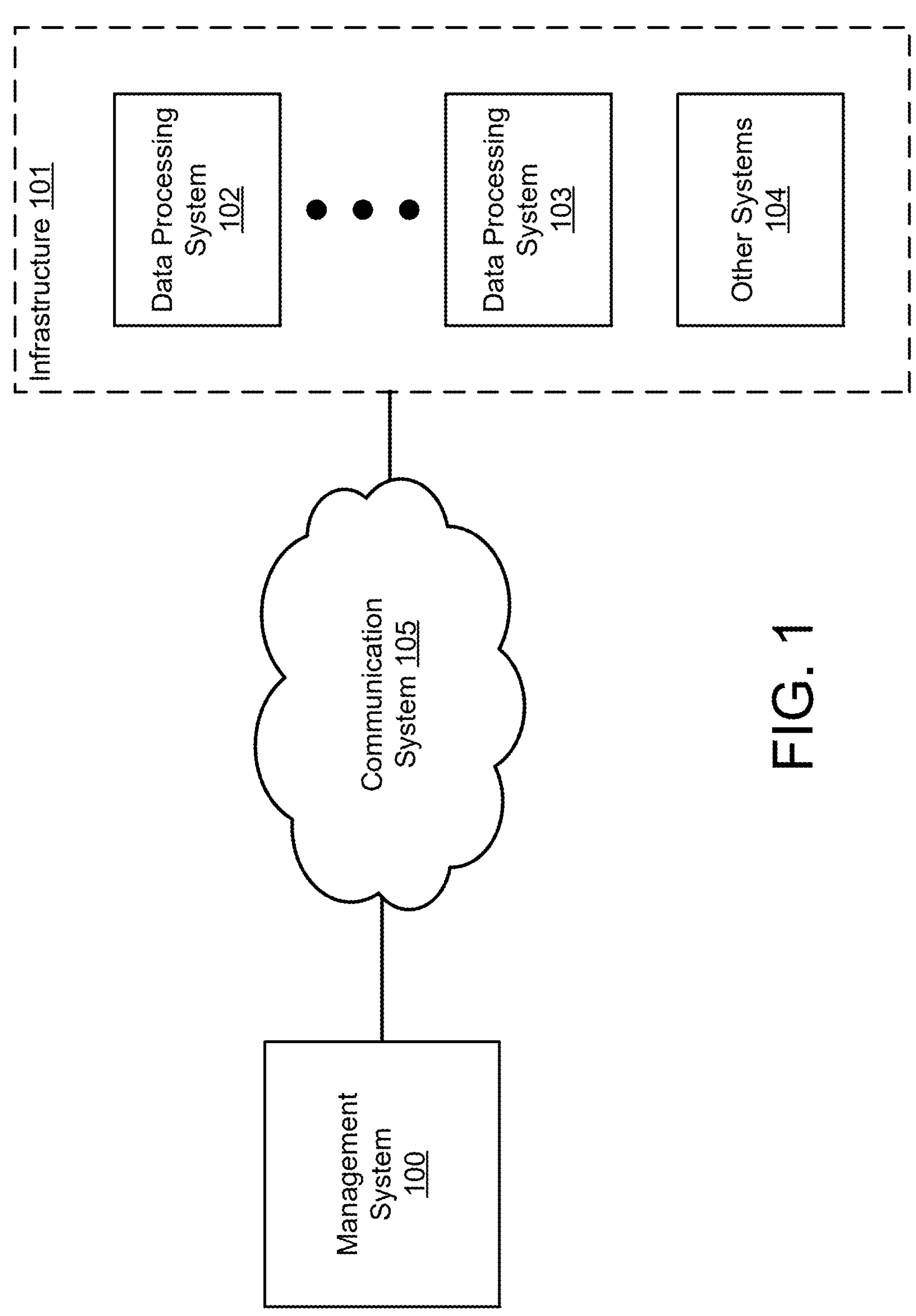
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer-implemented services. To provide the computer implemented services, information may be distributed and used in the services.

To facilitate distribution of the information, various requests may be sent. Prior to servicing the requests, distributed consensus analysis processes may be performed to attempt to authenticate the requests. If successfully authenticated, the requests may be honored and actions indicated by the requests may be performed.

If the requests are not honored, then remedial activity may be performed to reduce the likelihood of entities that sent the requests compromising receiving entities, or data hosted by the receiving entities.

By doing so, embodiments disclosed here may address, among others, security of distributed systems. By evaluating the requests prior to servicing the requests, the requests may be less likely to serve as successful attack vectors even when some devices that participate in the distributed consensus analysis process are already compromised. Thus, a system in accordance with an embodiment may be more likely to be able to provide desired computer implemented services with reduced risk of compromise.

In an embodiment, a method for managing operation of a distributed system is provided, the method may include obtaining, by a first data processing system of the distributed system, a request from a second data processing system of the distributed system; in response to receiving the request: initiating, by the first data processing system, performance of a distributed consensus analysis of the request by a portion of data processing systems of the distributed system to obtain a consensus decision regarding the request; in an instance of the initiating where the consensus decision indicates that the request is to be honored: servicing, by the first data processing system, the request to facilitate performance of desired computer implemented services; and initiating, by the first data processing system, distributed immutable recordation of an authentication transaction based on the distributed consensus analysis in instances of directed acyclic graph (DAG) network repositories maintained by the distributed systems.

Performing the distributed consensus analysis may include generating transactions for processing by a sub-portion of the portion of the data processing systems; providing the transactions to the sub-portion of the portion of the data processing systems; obtaining responses from the portion of the data processing systems based on the transactions; and reviewing the responses to identify the consensus decision.

The transactions may be requests for independent analysis of the request by each data processing system of the portion of the data processing systems, and the responses may indicate independently generated results.

Each of the data processing systems may maintain smart contracts that define limits on use of resources maintained by each of the data processing systems.

The portion of the data processing systems may be selected using a consensus protocol.

The consensus protocol may ensure that the portion of the data processing systems is not able to be identified prior to the performing of the distributed consensus analysis. For example, randomization procedures may be performed at the time of selection of the portion to make the portion unpredictable, distributed across the data processing systems, etc.

The consensus protocol is one selected from a group of consensus protocols consisting of a tangle protocol, and an avalanche protocol. The tangle protocol may be a leaderless, probabilistic consensus protocol that enables parallel validation of transactions without requiring total ordering (e.g., may also eliminate needs for intermediary miners or validators in block creations for DAG networks, thereby allowing for parallel writes to the DAG network repository). The avalanche protocol may be a blockchain protocol that uses a proof-of-stake consensus algorithm to verify transactions. The avalanche protocol may be decentralized, scalable, and/or robust protocol that is adapted to be energy efficient and resistant to attacks. The avalanche protocol may use a probabilistic protocol that involves repeated random sub-sampling. This process may turn each node into a voting station that decides whether to accept or reject a new transaction. The protocol may be adapted to tip in favor of the majority. It will be appreciated that other consensus protocols (e.g., Snow) may be used without departing from embodiments disclosed herein.

The directed acyclic graph network repositories may include immutable ledgers of the transactions of verifiable entries comprising at least the responses.

The data processing systems may be edge devices adapted to limit communications to between the edge devices and trusted management entities.

The method may also include, in another instance of the initiating where the consensus decision indicates that the request is to be dishonored: updating a security posture of at least the first data processing system to reduce a likelihood of compromise of the first data processing system due to the second data processing system potentially being compromised.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include data management services, data storage services, data access and control services, database services, and/or any other types of services that may be provided with a computing device.

To provide the services, information may be distributed across the system. For example, different components of the system may be physically distributed from each other, and may have access to different types of information. Some components may be able to locally obtain the information while others may need to use the information to provide the computer implemented services.

To enable different components to have access to the information for the services, the information may be transmitted via communication systems. For example, various pieces of infrastructure may store copies of the information and distribute copies of the information upon demand.

However, if a nefarious actor wishes to gain access to information, the nefarious actor may forge requests, may attempt to compromise various authentication and/or verification processes performed the system, and/or may take other action in the distributed system to gain access to sensitive information maintained by the components of the system. If successful, the nefarious actor may gain access to the information, may use the access to the information to further compromise the system, and/or may use the access to otherwise perform undesirable activities using the distributed system.

In general, embodiments disclosed herein may provide methods, systems, and/or devices for managing storage and distribution of information to provide computer implemented services. To provide the computer implemented services, various pieces of infrastructure (e.g., 101) may gather, store, and process information. The infrastructure may include edge systems (e.g., data processing systems 102-103) and/or other types of systems (e.g., communication devices such as network gateways, routers, file servers, etc.).

To manage access to information maintained by the infrastructure, the components of the infrastructure may be adapted to perform distributed consensus analysis of requests for access to information. The distributed consensus analysis may require that various components of the infrastructure independently evaluate requests for access to information.

Based on the independent analysis, a consensus decisions may be made regarding whether to honor or reject the requests. Honor requests may be serviced by the infrastructure while dishonored requests may be treated as indicators of potential threats (e.g., compromised components of the infrastructure). Information regarding the consensus decisions, requests, and corresponding analysis processes may be stored in an immutable ledger for audit and/or other purposes.

By doing so, embodiments disclosed herein may reduce the likelihood of compromise of information maintained by and/or portion of the infrastructure. Further, even if some of the infrastructure is compromised, the use of distributed consensus analysis may mitigate the threats posed by such portions of the infrastructure.

To provide the above noted functionality, the system of FIG. 1 may include management system 100, infrastructure 101, communication system 105. Each of these components is discussed below.

Infrastructure 101 may provide desired computer implemented services (e.g., used by other devices and/or components of infrastructure 101). To do so, infrastructure 101 may include any number of data processing systems (e.g., 102-103) and other systems 104.

The data processing systems may provide the desired computer implemented services. When doing so, the data processing systems may, as noted above, perform distributed consensus analysis processes to ascertain whether requests received by any of the data processing systems should be honored. Additionally, to support the distributed consensus process, each of the data processing systems may host directed acyclic graph (DAG) network repositories. The DAG network repositories may include immutable ledgers, access policies (e.g., in the form of smart contracts), and/or other information usable to (i) participated in distributed consensus processes, (ii) store information regarding the distributed consensus processes in an immutable and auditable manner, and/or otherwise facilitate distributed management of infrastructure 101.

Other systems 104 may include any number of other types of systems that may facilitate operation of the data processing systems. For example, other systems 104 may include network gateways, file servers, access points, servers, and/or other types of computing devices. Any of other systems 104 may or may not participate in the distributed consensus processes performed by the data processing systems.

Management system 100 may manage operation of infrastructure 101. To do so, management system 100 may define and/or otherwise provide policies used by infrastructure 101 to manage its operation. For example, the policies may include smart contracts that define resource access authorization based on information appended to the DAG network repositories.

For example, a smart contract my limit or provide access to information stored in a data processing system (or some logical portion there of, such as a drive, directory, database, etc.) to other data processing systems based on content of the DAG network repositories. The access may be dependent on requests from the other data processing systems being successfully authenticated. The smart contract may define what is a successful authentication (e.g., a majority of data processing systems agree that a request is authenticated) based on the content of the DAG network repositories. To facilitate operation of smart contracts, each data processing system may host frameworks or other architectures for distributed operation and execution of distribute ledgers, computing engines, etc. Thus, when the terms of a smart contract have been satisfied, access to a resource (e.g., some data) may automatically be granted to a requesting entity.

In addition to policies, management system 100 may take direct action (e.g., issue instructions) to update operation of any of infrastructure 101. To reduce the likelihood of compromise of infrastructure 101, in addition to the consensus processes disclosed herein, infrastructure 101 (or portions thereof) may be adapted to (i) limit network connectivity (e.g., only communicate with trusted management systems such as management system 100), (ii) encrypt communications, use tunnels, and/or other types of network functionalities to mitigate malicious network activity, and/or perform other actions to limit risk of compromise. However, to improve the ability of infrastructure 101 to provide desired computer implemented services, the components of infrastructure 101 may limit expenditure of computing resource for performance of various security actions. For example, any of the components may not utilize antivirus, malware scanning, deep packet inspection, and/or other computationally expensive security frameworks. Consequently, infrastructure 101 may dedicate a higher percentage of the available computing resources to provide computer implemented services while remaining more secure by limiting functionality of the components of infrastructure 101 (e.g., by performing network screening, distributed consensus processes, etc.).

Figure 2A:
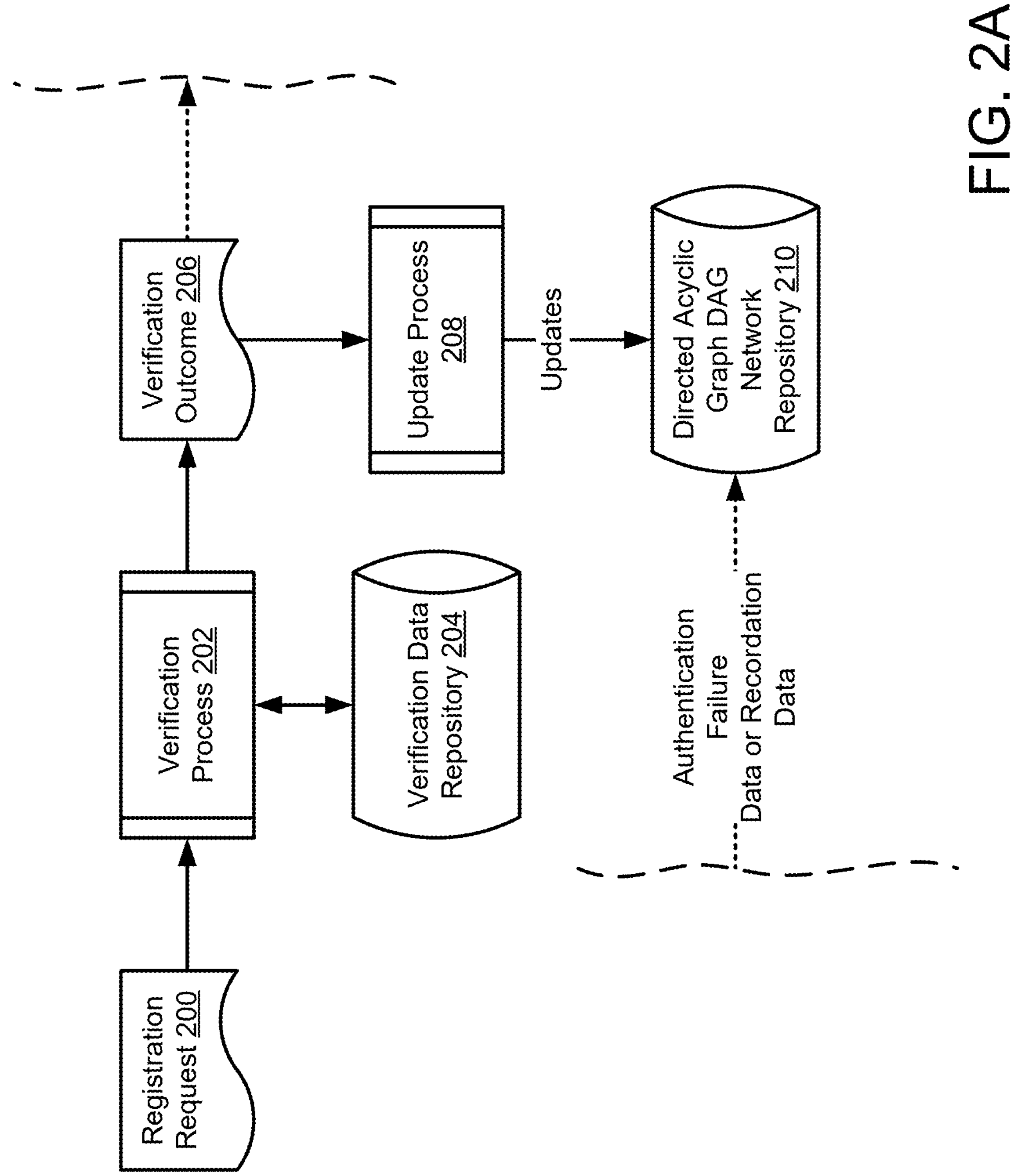
FIGS. 2A-2B show diagrams illustrating data flows in accordance with an embodiment.
Figure 2B:
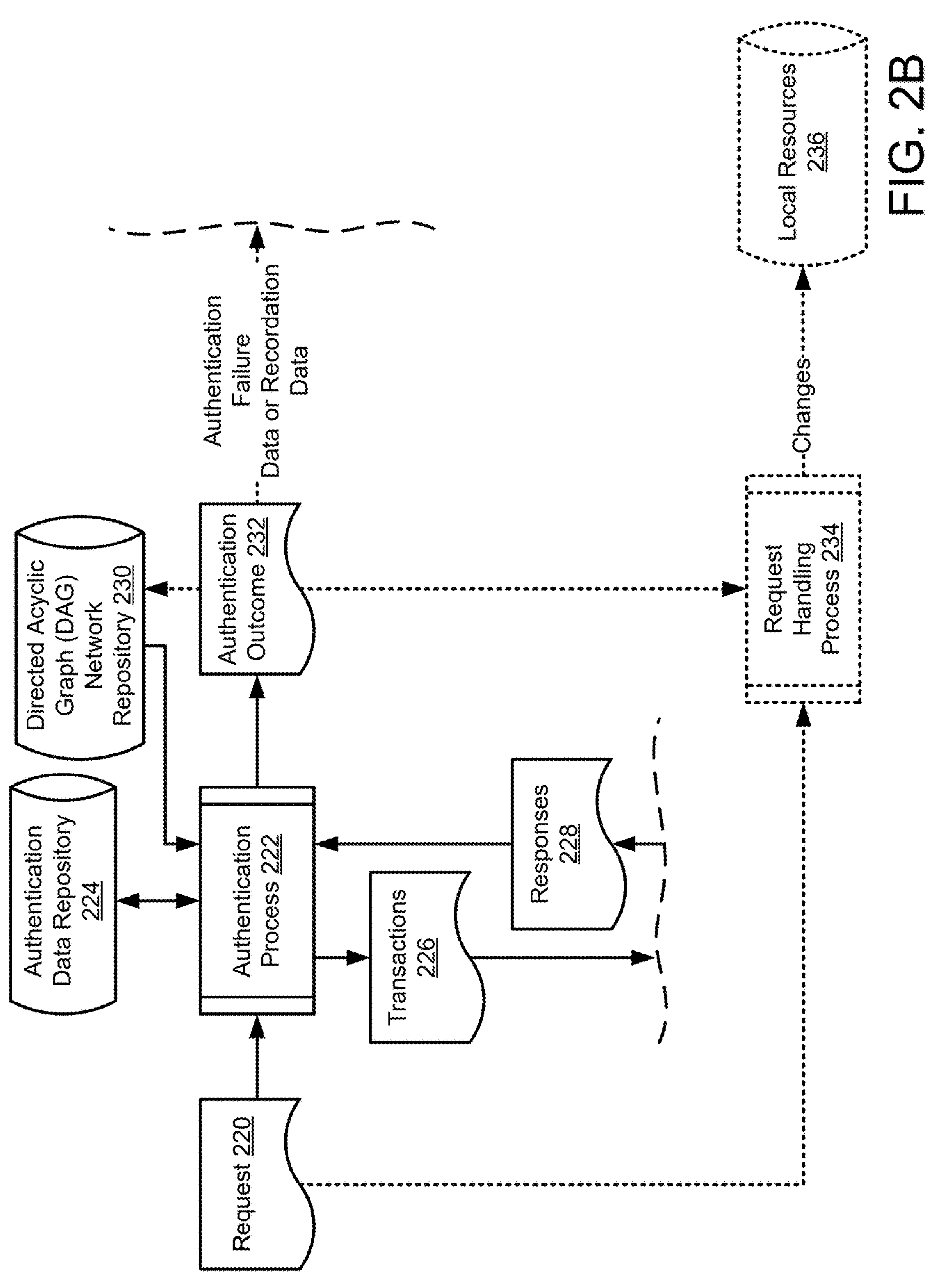
Figure 3:
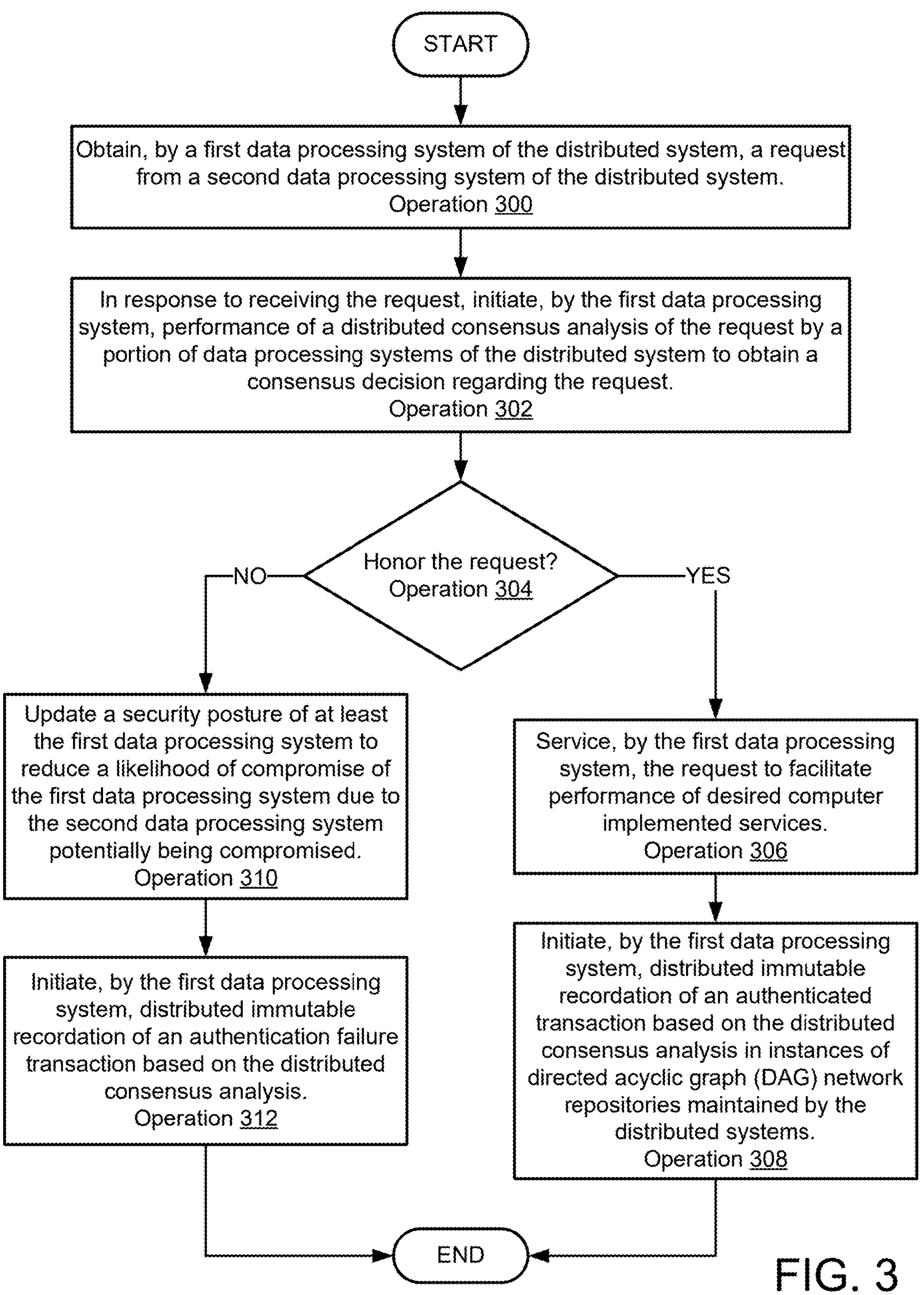
FIG. 3 shows a flow diagram illustrating a method of providing computer implemented services in accordance with an embodiment.

When providing their functionality, any of management system 100 and infrastructure 101 (and/or portions thereof) may perform all, or a portion, of the actions, flows, and methods shown in FIGS. 2A-3.

Any of (and/or components thereof) management system 100 and infrastructure 101 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

In an embodiment, infrastructure 101 performing whitelist screening of communications. Consequently, while connected to other components than those shown in FIG. 1, infrastructure 101 may automatically drop all, or a portion, of network communications from other components not on the whitelist.

While illustrated in FIG. 1 as including a limited number of specific components, a system in accordance with an embodiment may include fewer, additional, and/or different components than those illustrated therein.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 200, 206, etc.) is used to represent data structures, a second set of shapes (e.g., 202, 208, etc.) is used to represent processes performed using and/or that generate data, and a third set of shapes (e.g., 204, 210, etc.) is used to represent large scale data structures such as databases, tables, lists, etc.

Turning to FIG. 2A, a first data flow diagram in accordance with an embodiment is shown. The first data flow diagram may illustrate data used in and data processing performed in registration processes for data processing systems when joining infrastructure.

To join infrastructure, a newly added component such as a data processing systems may send a registration request (e.g., 200) to exiting components of the infrastructure. When so added, the data processing system may be a part of an edge cluster or other deployment of computing devices with various edge devices, servers, gateways, etc. serving as interconnected notes of the DAG network. The DAG network may be organized, for example, to prevent formation of loops or other non-DAG network structures. Thus, when physically added, the data processing system may be operably connected as part of the DAG network.

When initially powered on, the new data processing system may be adapted to automatically communicate with other components of the DAG network to register itself. Thus, registration requests 200 may be obtained by one or more of the other components of the infrastructure.

Once obtained, verification process 202 may be performed. During verification process 202, information from registration requests 200 may attempt to be verified. For example, registration request may include unique identification details (e.g., a globally unique identifier) and cryptographically verifiable credentials (e.g., a data structure signed with a private key maintained by the new data processing system). Information from verification data repository 204 may be used to attempt to verify the new data processing system. For example, the unique identification details may be compared to similar details of trusted systems (e.g., as defined by the management system), and the cryptographically verifiable credentials may be cryptographically verified (e.g., a signature verification algorithm may be performed using a trusted public key that is trusted to correspond to the private key used to create the signature). If the identification details and/or cryptographically verifiable credentials are successfully verified, then the new data processing system may be concluded as being verified.

The outcome of verification process 202 may be stored as verification outcome 206. Verification outcome 206 may be distributed to other component of the infrastructure so that update processes (e.g., 208) may be performed by the components of the system.

During update process 208, DAG network repository 210 may be updated based on the verification outcome. For example, if successfully verified, then the new data processing system may be recorded as a trusted member of the infrastructure in DAG network repository 210.

As will be discussed with respect to FIG. 2B, outcome of distributed authentications of requests from data processing systems may also be stored in DAG network repository 210 (e.g., authentication failure data or recordation data for successfully authenticated requests for access to resources).

Thus, using the method shown in FIG. 2A, embodiments disclosed herein may facilitate establishment and expansion of DAG networks of infrastructure components.

Turning to FIG. 2B, a second data flow diagram in accordance with an embodiment is shown. The second data flow diagram may illustrate data used in and data processing performed in servicing of requests for access to various resources.

During operation of infrastructure, various data processing systems may need to utilize data (e.g., resources) hosted by other data processing systems. To gain access to the data, requests (e.g., 220) may be generate and sent by requesting data processing resources to other data processing systems that host the data. When a request (e.g., 220) is received, an authentication process (e.g., 222) may be performed. The authentication process may be a distributed consensus based process. To perform the distributed consensus process, any number of transactions 226 may be generated and sent to other data processing systems of the infrastructure for independent evaluation. Responses 228 may be obtained from the data processing systems that indicate results of their independent evaluations of the requests. For example, each transaction may indicate that a request is to be evaluated. The request may be evaluated, for example, using information available to the respective data processing system. Consequently, different data processing systems may have different responses to a same request. For example, different data processing systems may have access to different sets of trusted public keys (e.g., usable to cryptographically verify requests), certificates delegating authority to various devices and usable to verify requests, etc.

The specific number of transactions, recipients for the transactions, and methods of evaluating the responses (e.g., to identify whether a positive or negative consensus decision has been reached) may be specified by authentication data repository 224. Authentication data repository 224 may include configurations and/or other information set by the management system. For example, authentication data repository 224 may specify (i) how number and identities of recipients of transactions 226 are to be selected (e.g., may be unpredictable prior to the time of selection), (ii) requirements for evaluation of requests 220, (iii) rules for interpreting the responses (e.g., a majority, a super majority such as ⅔, and/or other criteria for responses 228 indicating successful or unsuccessful authentication), and/or may include other information used in distributed consensus analysis.

As part of authentication process 222, information from DAG network repository 230 may be utilized. For example, the information may include an architecture of the DAG network. The recipients of transactions 226 may be selected based on the architecture.

Once a consensus decision is reached regarding authentication of request 220, an authentication outcome (e.g., 232) may be used to update the information stored in DAG network repository 230 of the respective data processing systems of the infrastructure. For example, the outcomes of the evaluations of the responses may be stored (e.g., as authentication failure data or recordation data of a successful authentication).

In addition to storing information regarding the outcome for future use, authentication outcome 232 may also drive various downstream processes. For example, if request 220 is successfully authenticated, then request 220 may be processed (e.g., via a dynamic performance of request handling process 234). During request handling process 234, smart contracts keyed to DAG network repository 230 may automatically execute, thereby granting the requestor access to resources indicated by the request (e.g., and granted to the extent allowed by the smart contract). While not shown, any number of smart contracts may continuously evaluate the DAG network repository and provide access to local resources 236 of the data processing system to a requestor. When such access is granted, the requestor may make changes to, read data from, and/or otherwise interact with local resources 236 to the extent granted by the smart contract.

To facilitate auditability of the infrastructure, DAG network repository 230 may include an immutable ledger in the form of a DAG. As transactions are processed (and/or other data), they may be added to the DAG with cryptographic verification data. The DAG may implement any cryptographic verification scheme for ensuring that data added to the DAG is immutable, authenticatable, and auditable. Consequently, the DAGs of DAG network repository 230 may be cryptographically verified over time.

For example, the DAGS may include nodes and edges interconnecting the nodes. The nodes may represent states of data over time, and the edges may represent changes made to the data. The nodes and/or edges may be linked to transactions/responses usable to authenticate that any changes made and/or access of local resources were in accordance with distributed consensus analysis decisions.

As part of distribution of information between data processing systems, secured communication channel may be used. These channel may utilized various encryption modalities to secure the channels.

Thus, using the flow shown in FIG. 2B, embodiments disclosed herein may facilitate authentication of requests (i) without relying on a centralized source of authority such as a management system which may be unreachable, and (ii) tolerant of some degree of compromise of other data processing systems (e.g., so long as a majority, super majority, etc. of the data processing systems are not compromised).

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to provide computer implemented services using local and/or remote information. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of providing computer implemented services in accordance with an embodiment is shown. The method may be performed by any of the components of the system of FIG. 1.

Prior to operation 300, a DAG network of component of infrastructure may be formed. Once formed, the components may begin to, as part of their functionality, request access to resources maintained by other data processing systems.

At operation 300, a request is obtained by a first data processing system of the distributed system from a second data processing system of the distributed system. The request may be obtained by reading it from storage, receiving it via a communication from the second data processing system, and/or via other methods. The request may be for access resources maintained by the first data processing system, performing certain operations, and/or for other activities.

At operation 302, in response to receiving the request, performance of a distributed consensus analysis of the request by a portion of data processing systems of the distributed system may be initiated to obtain a consensus decision regarding the request. The distributed consensus analysis may be initiated by generating transactions for processing by a sub-portion of the portion of the data processing systems, and providing the transactions to the sub-portion of the portion of the data processing systems. As part of the distributed consensus process, the first data processing system may obtain responses from the portion of the data processing systems based on the transactions, and reviewing the responses to identify the consensus decision.

The transactions may be generated by (i) selecting the sub-portion (e.g., using rules and/or an architecture of the DAG network), and (ii) generating corresponding transactions. Each transaction may be a request to attempt to authenticate the request obtained at operation 300 independently by the receiving data processing system. The responses may be the results of the independent attempts at authenticating the request. Because different data processing systems may have access to different information usable to authenticate the response (and/or for other reasons), different data processing systems may be able or unable to authenticate the request.

Once obtained, the responses may be compared to criteria (e.g., threshold levels of successful authentications) to identify whether the request is successfully or unsuccessfully authenticated.

At operation 304, a determination is made regarding whether to honor the request. The request may be honored if the consensus decision indicates that the request was successfully authenticated. Otherwise, the request may not be honored.

If the request is honored, the method may proceed to operation 306, otherwise the method may proceed to operation 310.

At operation 306, the request is serviced by the first data processing system to facilitate performance of desired computer implemented services. The request may be serviced by performing various actions (e.g., read/write/delete) to complete the request.

At operation 308, distributed immutable recordation of an authenticated transaction is initiated by the first data processing system. The authenticated transaction may be based on the distributed consensus analysis. The authenticated transaction may be recorded in DAG network repositories maintained by the distributed system. For example, copies of the transactions, responses, consensus decision, and/or other information may be distributed and appended to DAGs maintained by the data processing systems. When doing so, cryptographic information (e.g., signatures) may be added and/or linked to other entries in the DAG to provide for auditing and/or cryptographic verification of integrity of the data of the DAG.

The method may end following operation 308.

Returning to operation 304, the method may proceed to operation 310 following operation 304 when the request is not honored.

At operation 310, a security posture of at least the first data processing system is updated to reduce a likelihood of compromise of the first data processing system to due to the second data processing system being compromised. Other data processing systems of the infrastructure may similarly update security postures. The security postures may be updated, for example, by blacklisting the second data processing system, initiating higher levels of verification/authentication/etc. for the second data processing system, excluding the second data processing system from subsequent distributed consensus analysis processes (e.g., until the management systems instructs otherwise), and/or other actions may be performed to reduce likelihood of the first data processing system being compromised.

At operation 312, distributed immutable recordation of an authentication failure transaction is initiated by the first data processing system. The authentication failure transaction may be based on the distributed consensus analysis (e.g., in this case, a failure of authentication). The authentication failure transaction may be recorded in DAG network repositories maintained by the distributed system. For example, copies of the transactions, responses, consensus decision, and/or other information may be distributed and appended to DAGs maintained by the data processing systems. When doing so, cryptographic information (e.g., signatures) may be added and/or linked to other entries in the DAG to provide for auditing and/or cryptographic verification of integrity of the data of the DAG.

The method may end following operation 312.

Using the methods illustrated in FIG. 3, embodiments disclosed herein may facilitate provisioning of computer implemented services in a distributed environment in a manner that reduces a likelihood of compromise of data processing systems. By using a distributed consensus analysis process prior to honoring requests, the data processing systems may be less likely to service requests that are more likely to result in compromise of data, the data processing systems, etc.

Figure 4:
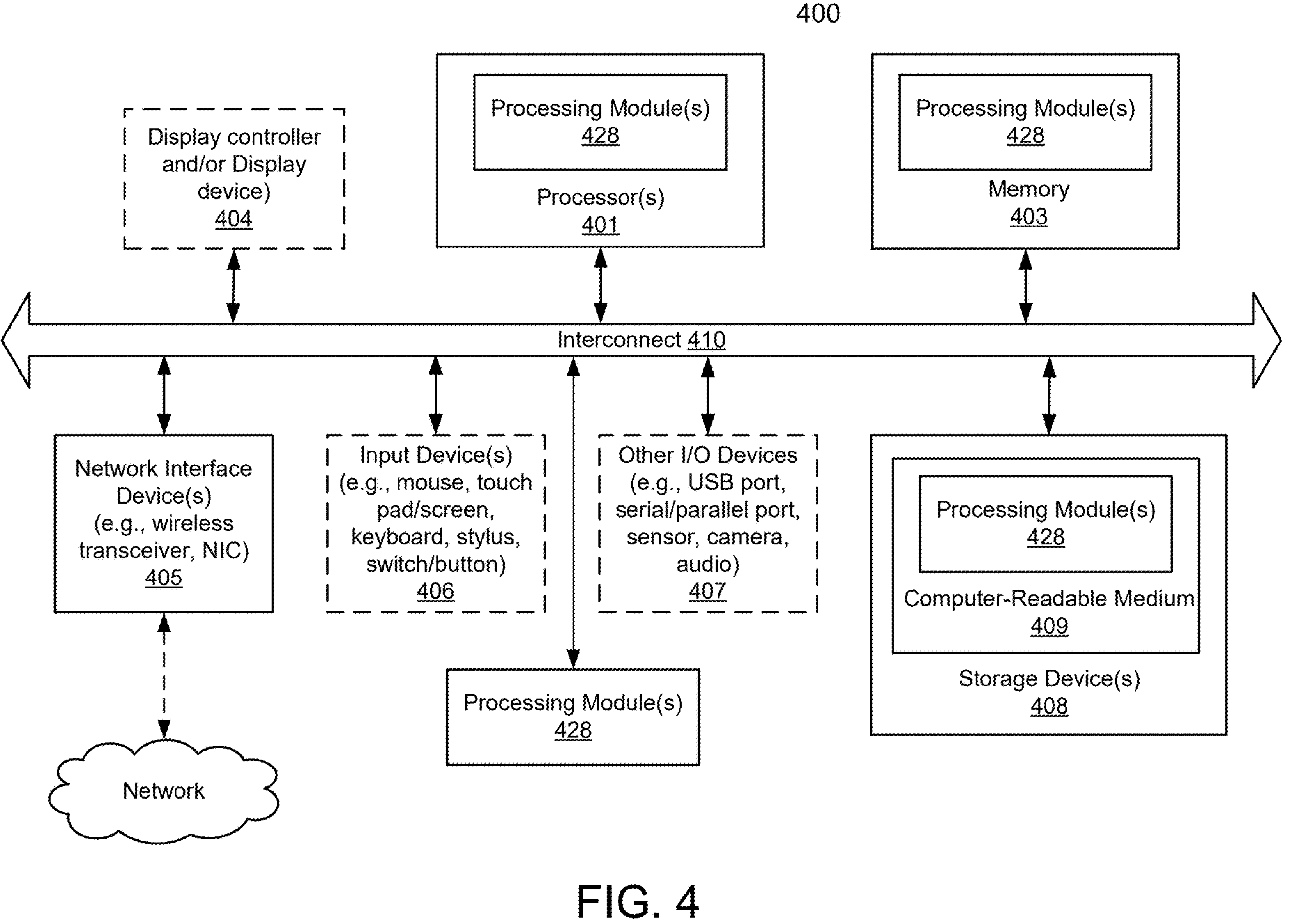
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a distributed system, the method comprising:

obtaining, by a first data processing system of the distributed system, a request from a second data processing system of the distributed system;

in response to receiving the request:

initiating, by the first data processing system, performance of a distributed consensus analysis of the request by a portion of data processing systems of the distributed system to obtain a consensus decision regarding the request;

in an instance of the initiating where the consensus decision indicates that the request is to be honored:

servicing, by the first data processing system, the request to facilitate performance of desired computer implemented services; and initiating, by the first data processing system, distributed immutable recordation of an authentication transaction based on the distributed consensus analysis in instances of directed acyclic graph (DAG) network repositories maintained by the distributed systems, wherein the portion of the data processing systems comprises a first portion that performs the distributed consensus analysis using a first public key and a second portion that performs the distributed consensus analysis using a second public key different from the first public key.

2. The method of claim 1, wherein performing the distributed consensus analysis comprises:

generating transactions for processing by a sub-portion of the portion of the data processing systems;

providing the transactions to the sub-portion of the portion of the data processing systems;

obtaining responses from the portion of the data processing systems based on the transactions; and reviewing the responses to identify the consensus decision.

3. The method of claim 2, wherein the transactions are requests for independent analysis of the request by each data processing system of the portion of the data processing systems, and the responses indicate independently generated results.

4. The method of claim 3, wherein each of the data processing systems maintain smart contracts that define limits on use of resources maintained by each of the data processing systems.

5. The method of claim 3, wherein the portion of the data processing systems is selected using a consensus protocol.

6. The method of claim 5, wherein the consensus protocol ensures that the portion of the data processing systems is not able to be identified prior to the performing of the distributed consensus analysis.

7. The method of claim 6, wherein the consensus protocol is one selected from a group of consensus protocols consisting of a tangle protocol, and an avalanche protocol.

8. The method of claim 2, wherein the DAG network repositories comprise immutable ledgers of the transactions of verifiable entries comprising at least the responses.

9. The method of claim 1, wherein the data processing systems are edge devices adapted to limit communications to between the edge devices and trusted management entities.

10. The method of claim 1, further comprising:

in another instance of the initiating where the consensus decision indicates that the request is to be dishonored:

updating a security posture of at least the first data processing system to reduce a likelihood of compromise of the first data processing system due to the second data processing system potentially being compromised.

11. A non-transitory machine-readable medium having instructions stored therein, which when executed by a processor, cause operations for managing operation of a distributed system to be performed, the operations comprising:

obtaining, by a first data processing system of the distributed system, a request from a second data processing system of the distributed system;

in response to receiving the request:

initiating, by the first data processing system, performance of a distributed consensus analysis of the request by a portion of data processing systems of the distribution system to obtain a consensus decision regarding the request;

in an instance of the initiating where the consensus decision indicates that the request is to be honored:

servicing, by the first data processing system, the request to facilitate performance of desired computer implemented services; and initiating, by the first data processing system, distributed immutable recordation of an authentication transaction based on the distributed consensus analysis in instances of directed acyclic graph (DAG) network repositories maintained by the distributed systems, wherein the portion of the data processing systems comprises a first portion that performs the distributed consensus analysis using a first public key and a second portion that performs the distributed consensus analysis using a second public key different from the first public key.

12. The non-transitory machine-readable medium of claim 11, wherein performing the distributed consensus analysis comprises:

generating transactions for processing by a sub-portion of the portion of the data processing systems;

providing the transactions to the sub-portion of the portion of the data processing systems;

obtaining responses from the portion of the data processing systems based on the transactions; and reviewing the responses to identify the consensus decision.

13. The non-transitory machine-readable medium of claim 12, wherein the transactions are requests for independent analysis of the request by each data processing system of the portion of the data processing systems, and the responses indicate independently generated results.

14. The non-transitory machine-readable medium of claim 13, wherein each of the data processing systems maintain smart contracts that define limits on use of resources maintained by each of the data processing systems.

15. The non-transitory machine-readable medium of claim 13, wherein the portion of the data processing systems is selected using a consensus protocol.

16. A system, comprising:

a processor; and a memory coupled to the processor to store instructions, which when executed by the processor, cause operations for managing data in a distributed system to be performed, the operations comprising:

obtaining, by a first data processing system of the distributed system, a request from a second data processing system of the distributed system;

in response to receiving the request:

initiating, by the first data processing system, performance of a distributed consensus analysis of the request by a portion of data processing systems of the distributed system to obtain a consensus decision regarding the request;

in an instance of the initiating where the consensus decision indicates that the request is to be honored:

servicing, by the first data processing system, the request to facilitate performance of desired computer implemented services; and initiating, by the first data processing system, distributed immutable recordation of an authentication transaction based on the distributed consensus analysis in instances of directed acyclic graph (DAG) network repositories maintained by the distributed systems, wherein the portion of the data processing systems comprises a first portion that performs the distributed consensus analysis using a first public key and a second portion that performs the distributed consensus analysis using a second public key different from the first public key.

17. The system of claim 16, wherein performing the distributed consensus analysis comprises:

generating transactions for processing by a sub-portion of the portion of the data processing systems;

providing the transactions to the sub-portion of the portion of the data processing systems;

obtaining responses from the portion of the data processing systems based on the transactions; and reviewing the responses to identify the consensus decision.

18. The system of claim 17, wherein the transactions are requests for independent analysis of the request by each data processing system of the portion of the data processing systems, and the responses indicate independently generated results.

19. The system of claim 18, wherein each of the data processing systems maintain smart contracts that define limits on use of resources maintained by each of the data processing systems.

20. The system of claim 18, wherein the portion of the data processing systems is selected using a consensus protocol.

* * * * *